United States Patent [19]
Ghiotto

[11] 3,842,863
[45] Oct. 22, 1974

[54] AUTOCLAVE TANK FOR HYDRAULIC LIFTING PLANTS

[76] Inventor: Renzo Ghiotto, 90 Via Matteotti, Montecchio Maggiore (Vicenza), Italy

[22] Filed: Nov. 14, 1972

[21] Appl. No.: 306,379

[30] Foreign Application Priority Data
July 11, 1972  Italy.................................. 85596/72

[52] U.S. Cl. .............................................. 138/30
[51] Int. Cl. ........................................... F16l 55/04
[58] Field of Search........................ 138/30, 26, 27

[56] References Cited
UNITED STATES PATENTS
1,579,891  4/1926  Sandoz................................ 138/30
2,290,337  7/1942  Knanth ................................ 138/30
2,448,118  8/1948  Pellettere............................. 138/30
2,594,833  4/1952  White .............................. 138/30 X Primary Examiner—Jerry W. Myracle
Attorney, Agent, or Firm—William Anthony Drucker

[57] ABSTRACT

An autoclave tank, for hydraulic lifting plants, of the kind including a rigid external envelope inside which is contained an internal elastic envelope for holding water, is characterised by means inside the tank for limiting the maximum volume of expansion of the internal elastic envelope, said means consisting of a tubular wall extending through the entire length of the external envelope of the tank, and fixed thereto at the base and at the summit.

1 Claim, 2 Drawing Figures

AUTOCLAVE TANK FOR HYDRAULIC LIFTING PLANTS

The object of the present invention is to provide an autoclave tank for hydraulic lifting plants, of the kind in which the internal space is divided into two parts by an elastic membrane, inside which water to be kept in the tank is introduced, while on the outside there is air which is under pressure when the water is let into the membrane.

The characteristic feature of the present invention is that inside the tank there is a tubular wall which extends through the entire length of the external envelope of the tank and is fixed thereto at the base and at the summit, said wall serving to limit the expansion of the internal elastic membrane, thus fixing an exact division between the space occupied by the water under maximum pressure, inside the internal elastic envelope, and the corresponding space occupied by the air or other gas under pressure inside the tank, which limits the volume occupied by the water by reference to the total volume of the tank, so as to reach the best ratio for the functioning of the tank.

The particular shape of the tubular wall, makes it possible to produce tanks which, still having the same external dimensions, have various values of effective maximum capacity.

It does not matter whether the external envelope of the tank is cylindrical or spherical in shape, provided that the wall which limits the maximum expansion of the elastic envelope runs through the whole tank from the bottom to the top.

The space inside the wall which limits the expansion of the elastic envelope communicates with the space outside, which is limited by the external envelope, for example by means of holes or passages hollowed out in the limiting wall itself.

A further advantage obtained by the adoption of the present invention lies in the ease with which the internal elastic envelope can be withdrawn from the tank, for example for replacement; this is due to the fact that the envelope is guided, while being withdrawn, by the limiting wall.

There is the further advantage that, if the internal elastic envelope is of suitable dimensions, it is not further subjected to expansion; this notably increases its life.

An embodiment of the invention is hereinafter described in detail with reference to the accompanying drawings, wherein.

Figure 1:
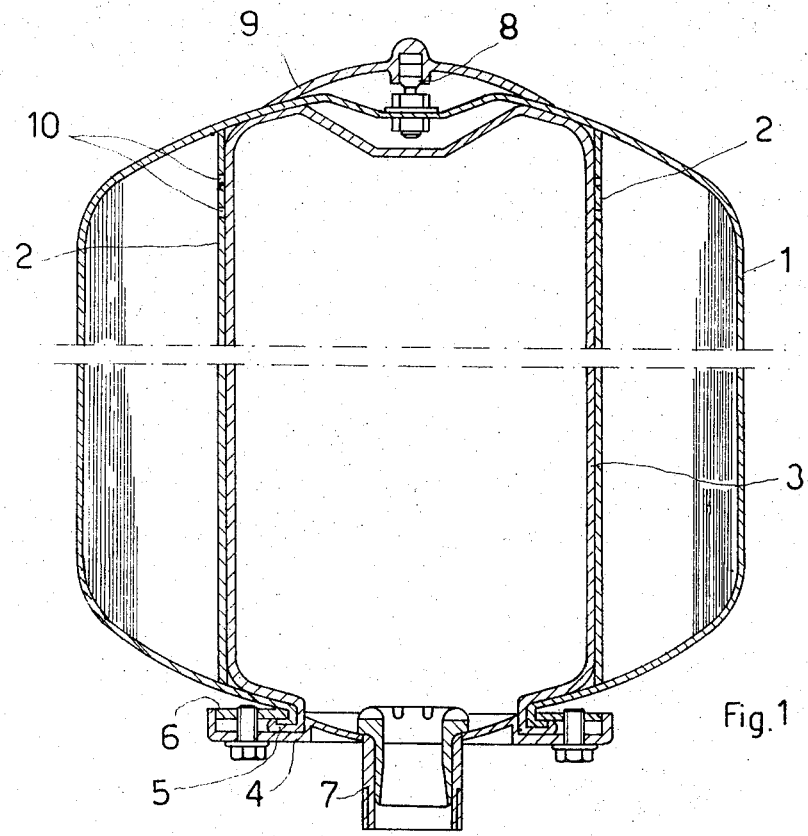
FIG. 1 is a section taken on a plane containing the vertical axis of the tank.
Figure 2:
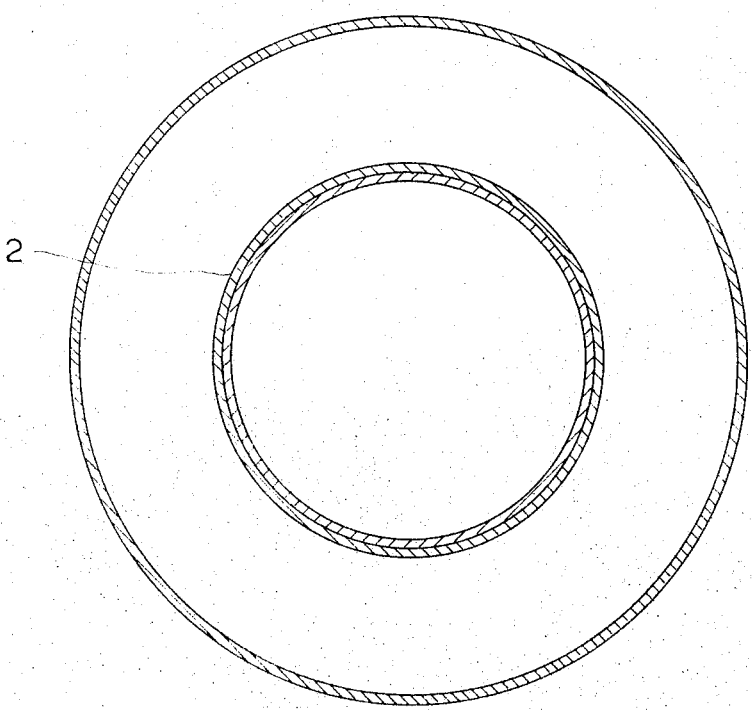
FIG. 2 is a section thereof on a horizontal plane.

The tank includes an external envelope 1, which is shown as cylindrical but may be spherical in shape. Inside this envelope 1 there are fixed, e.g. by welding a lateral limiting wall 2, which extends through the tank from base to top, thus fixing a maximum limit of expansion for an internal envelope 3, of stretchable rubber, into which the water contained in the tank is introduced.

The elastic envelope 3 is fixed to the base of the tank by means of an annular disc 4 which co-operates with a ring 6 to press a lip 5 of the envelope 3 against a flange formed at the base of the external container 1.

In the centre of disc 4 is provided an inlet orifice 7 through which water contained in the tank is admitted.

Air outside the elastic envelope 3 is admitted through a valve 8 fixed at the top of the external envelope 1 and closed above by a cap 9.

In the limiting wall 2 there are formed passages, consisting for example of holes 10 which ensure communication between the space inside the wall 2 and the space outside the same, which is limited by the external envelope 1.

There is an obvious advantage to the present invention, since, without altering the dimensions of the external envelope 1, it is possible to give the tank a different maximum hudraulic capacity, simply by modifying the dimensions of the limiting wall 2 to the maximum expansion offered by the elastic envelope 3; apart from anything else this may constitute a practical advantage, in that the constant overall external dimensions make it easier to design the hydraulic lifting plant, in so far as the dimensions of the autoclave tank are independent of its effective capacity.

I claim:
1. A round pressure tank vessel comprising:
   inner and outer vessel walls;
   an elastic envelope within the vessel connected to a single external opening and containing liquid;
   a rigid perforate tubular member within the vessel extending along the vessel length and containing said envelope;
   gas under pressure in a cavity between the vessel walls and the tubular member; and a gas pressure control valve for introducing gas through the vessel wall whereby gas pressure on the outside of the envelope is transmitted there through to the liquid to maintain the pressure thereof.

* * * * *